United States Patent Office 3,452,949
Patented July 1, 1969

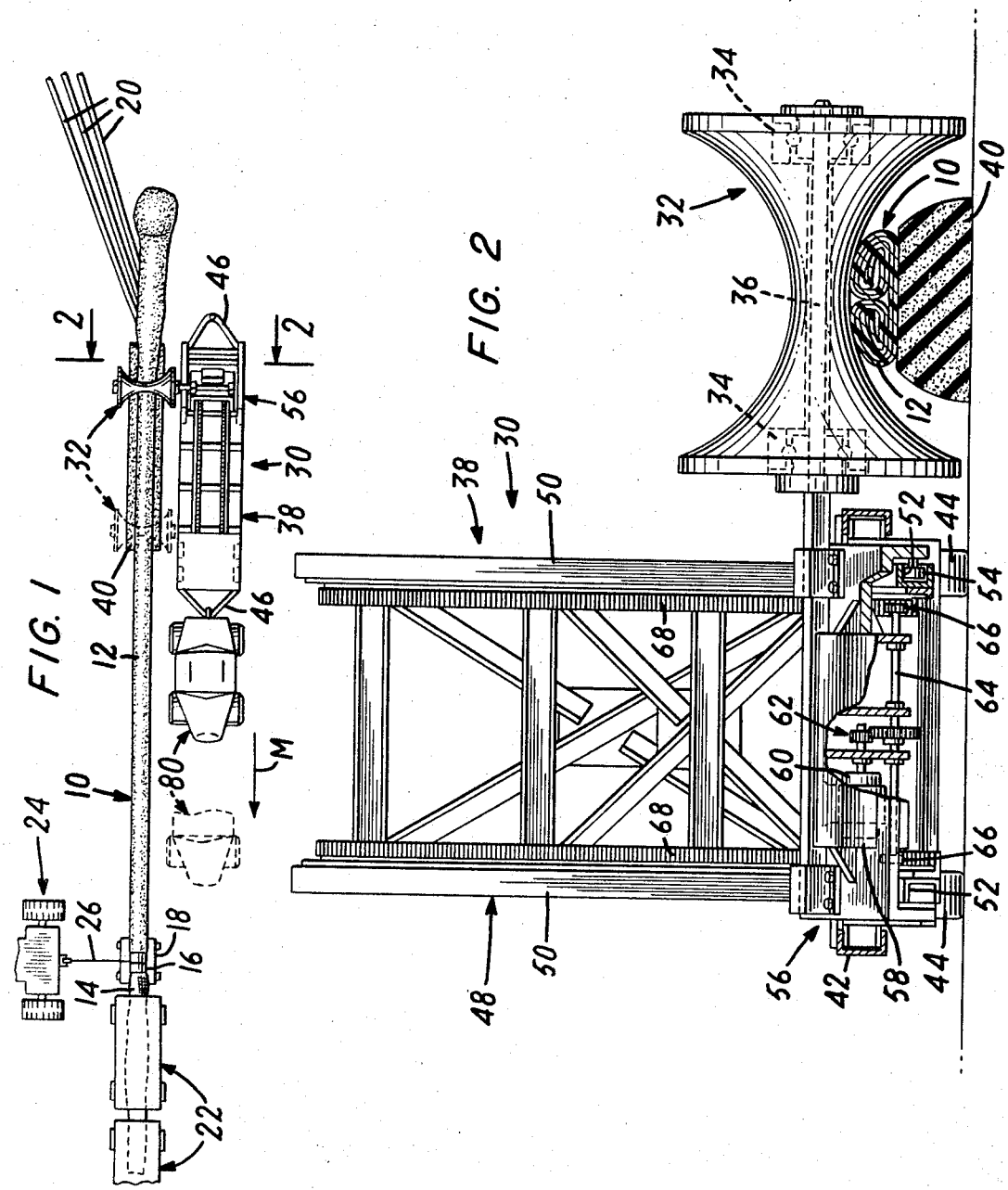

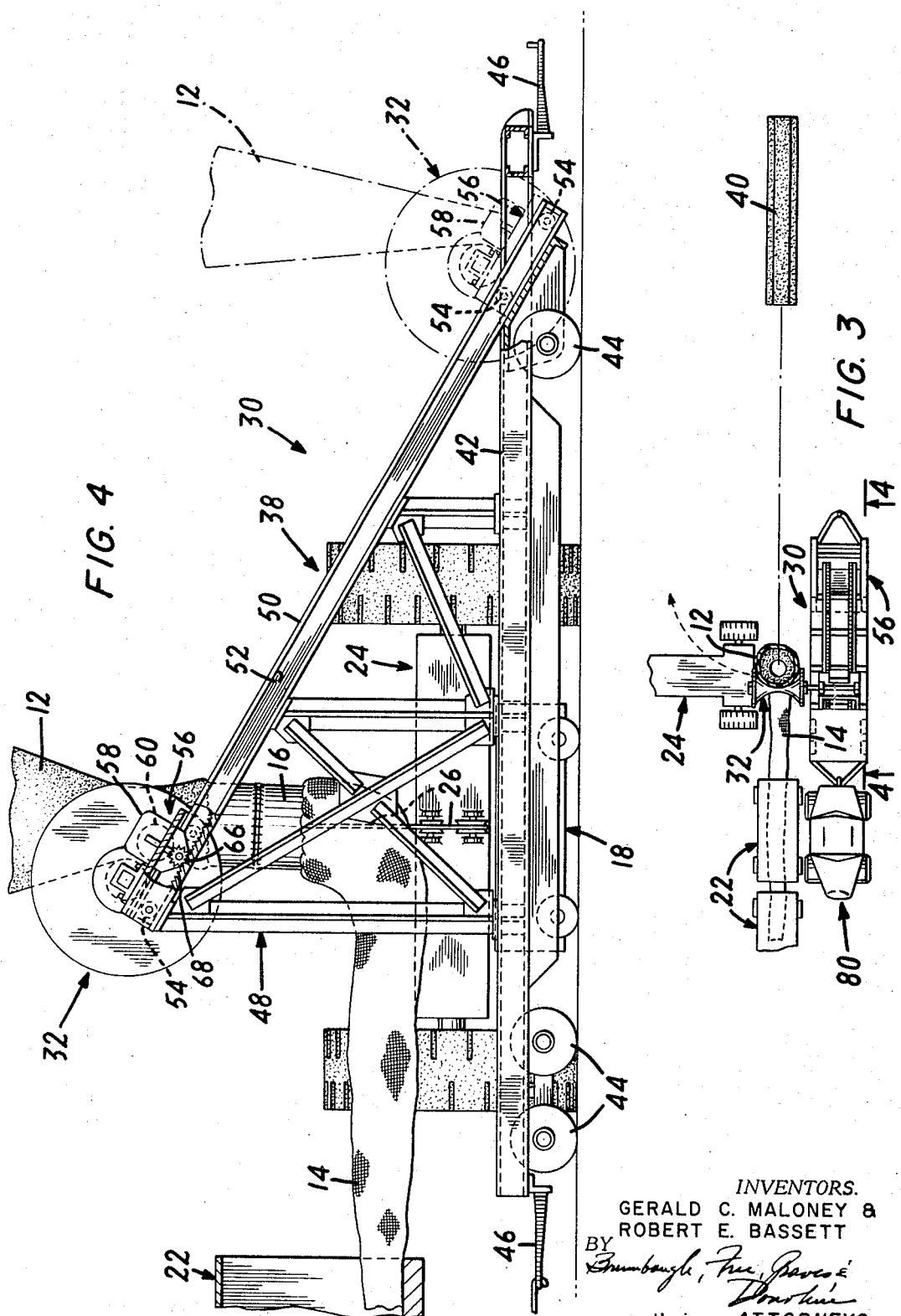

3,452,949
BALLOON LAUNCHING SYSTEM AND METHOD
Gerald C. Maloney, Rockville, and Robert E. Bassett, Silver Spring, Md., assignors to Vitro Corporation of America, New York, N.Y., a corporation of Delaware
Filed Mar. 31, 1967, Ser. No. 627,423
Int. Cl. B64b 1/58
U.S. Cl. 244—31                                              8 Claims

ABSTRACT OF THE DISCLOSURE

A balloon restraining and inflation control unit for use as a component of a system for launching large balloons of the type used to carry aloft scientific equipment and other payloads of various types for such purposes as scientific investigation or experimentation in high altitude environments. The unit comprises a rotatable balloon inflation roll cantilevered from a ballasted mounting bed, preferably a mobile trailer. The roll is mounted for vertical movement between a lower position in which it engages and holds the balloon envelope closed at a point spaced from the balloon envelope apex and an elevated position in which it still guides the partially inflated balloon but permits couplings associated with the balloons and elements of the launch system to pass under the roll without requiring dismantling of any part of the control unit.

Background of the invention

This invention relates to apparatus for launching large balloons of the type used to carry aloft scientific equipment and other payloads of various types for such purposes as scientific investigation and experimentation in high altitude environments. In particular, the invention is a novel and improved balloon restraining and inflation control unit for use as a component of balloon launching apparatus, and a balloon launching method.

Large balloons, on the order of several million cubic feet capacity, are used to carry aloft various payloads for taking various measurements of atmospheric conditions, conducting scientific experiments, testing devices connected with the space exploration program, astronomical research and other purposes. These balloons range from relatively small sizes, say those having a volume of less than two million cubic feet, up to the largest-sized balloon launched to date which has a capacity of twenty-six million cubic feet, stands 800 feet from the ground, and is designed to carry a payload of 1700 pounds to an altitude of 130,000 feet. They are constructed of various lightweight, low permeability materials, usually plastic film or plastic film with a fabric or scrim reinforcing, which, even though they have relatively high tensile strength, are readily torn or ripped upon contact with the ground or objects on the ground, such as rocks, trees, buildings, and even heavy grass.

A critical and difficult phase of a ballooning operation is the inflation and launching procedure. For one thing, the balloon envelope, being of very thin gauge, lightweight material, is highly susceptible to tearing or other damage during the launch, and it is therefore important to avoid as much as possible dragging the envelope along the ground. Further, the balloon envelope is bulky and cumbersome to handle because of its tremendous size and relatively high total weight. Moreover, as filling proceeds, the lifting forces increase, and the restraining forces needed to keep the balloon under control correspondingly increase, particularly when there is even a very slight breeze blowing at the launch site. It is important, of course, to keep the balloon under control at all times during gas-filling and deployment so that it does not drag the uninflated portion of the envelope across the ground and so that the envelope does not come into contact with objects on the ground.

One component of most balloon launch systems is a restraining and inflation control unit that is used during the gas filling stage of the launch operation to isolate or seal off a predetermined section of the apex of the balloon from the remainder of the envelope so that only this portion of the balloon is filled while the major part of the envelope remains collapsed. This unit also restrains the filled portion as inflation proceeds so that inflation can be completed through filling tubes of minimum length.

One form of restraining and inflation control unit that has been used resembles the old-fashioned washing machine wringer; it is composed basically of a weighted frame carrying a pair of rolls which engage the balloon envelope and squeeze it closed at a predetermined place. One very important disadvantage of this type of unit is its lack of any provision for conveniently and efficiently disengaging the rolls from the balloon after inflation has been completed while at the same time maintaining good control over the balloon. This problem, though substantial for single balloons, is even more critical in a tandem balloon system, that is, a balloon system which consists of a relatively smaller size launch balloon and a relatively larger size main balloon.

In a tandem balloon system, the launch and main balloons are coupled together by a rigid coupling which, of course, cannot pass between the rolls and therefore requires that the rolls be separated and, generally, be disengaged completely from the balloon before the balloon system is allowed to ascend further. Usually, a crane is used to remove the upper one of the rolls when ascent is to begin, but such removal of the upper roll releases the balloon and removes the restraint and control over the ascent of the balloon that the unit normally provides.

Summary of the invention

There is provided, in accordance with the invention, a novel and improved balloon restraining and inflation control unit for use as a component of a balloon launch system which overcomes the aforementioned difficulties and provides significant advantages and results. More particularly, the unit comprises a ballasted mounting unit and a rotatable balloon inflation roll cantilevered laterally from the mounting unit and mounted on it for selective movement between a lower position, where it restrains and controls the balloon envelope by engaging it against a back-up during inflation, and an elevated position in which couplings and other elements of the balloon and components of the launch apparatus can freely pass under the roll.

The ballast unit may be a mobile trailer that can be moved relative to the envelope during the launch operation while the envelope remains substantially stationary. Thus, the inflated portion of the balloon is permitted to ascend gradually by moving the trailer away from the apex. The mounting system for the cantilevered inflation roll can take various forms, such as an inclined track supporting a carriage on which the roll is mounted, an elevator type of system, or a lever-like rocking frame. The unit may embody a powered drive for carrying out the up and down movements of the roll between its lower and elevated positions.

A preferred form of inflation roll is one having an hourglass shape such that the balloon envelope is encompassed by the concave surface of the roll, and the roll is used in conjunction with a back-up member, such as a strip of resilient rubber or synthetic rubber foam material or the like. The envelope is squeezed between the back-up member and the roll to close off the zone at the apex of the balloon to be inflated.

In operation, the upper portion of the balloon envelope is laid out on the foam back-up member and engaged by the roll which is located in its lower position. Inflation of the balloon is then initiated in the usual manner through inflation tubes leading into the closed off region at the apex. During the inflation, the balloon is restrained or held down by the roll, and the forces created between the roll and the back-up member prevent inflation of the remainder of the balloon. As the apex part of the envelope gradually fills, the mobile unit can be moved away from the apex to progressively release more balloon envelope material for filling and the roller may be elevated as required towards its upper position. After the roll is removed from engagement with the balloon, the hold down function is taken over by a tethering cable. In the elevated position, any couplings, such as those used to connect a launch balloon to a main balloon in a tandem balloon system, or other elements of the balloon and various components of the launch apparatus that may be in the path of the unit, can freely pass under the cantilevered inflation roll.

An important advantage of the unit of the invention is that the movable inflation roll affords much greater freedom in the handling of the balloon during the launch operation. Moreover, the ability of the roll to be vertically raised so that it clears elements of the balloon and components of the launch apparatus enables control of the balloon even at times when such elements, components or both would otherwise interfere with and obstruct operations. By providing a mounting for the roll which is mobile and vertically movable, the balloon can be better controlled as gas filling proceeds and the setting up of the balloon is facilitated by permitting the envelope to be strung out and rigged for launch before the balloon restraining and inflation control unit is brought into position. With the inflation roll cantilevered, there is no problem with obstructions beneath it; such obstructions in presently known launch equipment are always a source of inconvenience and, moreover, of possible damage to the balloon envelope.

*Brief description of the drawings*

For a better understanding of the invention, reference may be made to the following description of an exemplary embodiment, taken in conjunction with the figures of the accompanying drawings, in which:

FIG. 1 is a plan view showing the unit of the invention and other components of a balloon launching system in the positions they occupy during the initial stages of balloon inflation;

FIG. 2 is an end view in section of the balloon restraining and inflation control unit on a relatively larger scale than FIG. 1, taken generally along the lines 2—2 of FIG. 1 and looking in the direction of the arrows;

FIG. 3 is a plan view of the launching system at a later stage in the launching procedure; and FIG. 4 is a side view in section of the unit of the invention, the view being taken generally along the lines 4—4 of FIG. 3 and looking in the direciton of the arrows and being on a relatively larger scale than FIG. 3.

*Description of exemplary embodiment*

The exemplary embodiment of the invention shown in the drawings and described hereinafter is used in conjunction with other components of a balloon launching apparatus to inflate and launch a tandem balloon system. Referring to FIG. 1, the tandem balloon system, which is designated generally by the reference numeral 10, is composed of a relatively smaller-sized launch balloon 12 and a relatively larger-sized main balloon 14, the two balloons, 12 and 14, being connected to each other by a coupling 16. As the initial steps of the launch operation, the launch balloon 12 is laid out on a ground cloth, the coupling 16 between the launch balloon and the main balloon, which is supported on a dolly 18, is connected up and the inflation tubes 20 leading to the apex portion of the launch balloon 12 are hooked up to helium tanks (not shown). The main balloon 14 is packed in boxes transported to the site by trailers 22. Desirably, the main balloon is boxed so that it can be deployed readily without being previously strung out. One important component of the launch apparatus is a ballasted cable carrier 24 which includes a cable reel (not shown in detail) and suitable apparatus for paying out a tether cable 26 attached to the coupling 16 for controlling the ascent of the balloon until it and its payload are in flight, at which time the tether cable is disconnected and the balloon system released, as will be described in more detail hereinafter.

The balloon restraining and inflation control unit of the invention is designated generally by the reference numeral 30 and is preferably moved into position after the balloon system 10 has been rigged for inflation and ascent. The unit 30 includes an hourglass-shaped inflation roll 32 journaled by bearings 34 on a shaft 36 which is cantilevered from a mobile trailer unit 38. As best shown in FIG. 2, the roll 32 engages and squeezes the launch balloon envelope 12 against a back-up strip 40, which is preferably made of rubber or synthetic rubber foam.

Referring next particularly to FIGS. 2 and 4, the trailer 38 includes a bed 42 which is mounted on wheels 44 and is provided with a towbar 46 at each end. Mounted on the bed 42 is a truss framework 48 which supports a pair of parallel, spaced-apart, inclined tracks 50. The tracks 50 are channel-shaped in section (FIG. 2) with their flanges facing outwardly to define trackways 52 for receiving rollers 54 on a carriage 56. The shaft 36 carrying the balloon inflation roll 32 is suitably affixed to the carriage 56.

The carriage 56 is provided with a powered drive unit 58 which includes, for example, an electric motor 60 and a reduction gear mechanism 62 (shown schematically) driven by the motor. The output of the reduction gear mechanism 62 is coupled to a transverse shaft 64 having a toothed wheel 66 at each end which engages and meshes with the teeth of cogged tracks 68 mounted on the frame 48 inboard from the inclined tracks 50. The power drive system can be operated to roll the carriage 56 along the track between (1) a lowermost position (FIGS. 1 and 2) where the inflation roll 32 engages the launch balloon envelope 12 against the back-up member 40 as the balloon is being filled with gas and (2) an upper or elevated position (FIGS. 3 and 4) in which the inflation roll 32 is supported high enough to permit it to pass freely over the balloon coupling 16 and components of the launch apparatus, such as the cable trailer 24, that may lie along its path as the unit 30 is moved forward.

The launch sequence begins with the tandem balloon system 10 rigged for launch in the manner portrayed in FIG. 1 and with the inflation roll 32 engaging the launch balloon 12 at a predetermined point spaced from its apex against a point near the right end (with respect to FIG. 1) of the back-up member 40. The launch balloon envelope 12 is then filled with helium through the inflation tubes 20. As the helium fills the upper part of the launch balloon, it is prevented from flowing into the remainder of the launch balloon by the squeezing pressure on the envelope between the inflation roll 32 and the back-up 40. As gas filling proceeds and the sealed-off, inflated portion of the launch balloon is expanded to its design capacity, the balloon restraining and inflation control unit 30 may be pulled forward by a tractor 80 in the direction indicated by the arrowed line M toward a position near the left end of the back-up 40, as indicated by the phantom line showing in FIG. 1, to pay out progressively additional increments of uninflated balloon envelope for filling. It is clear, of course, that as inflation proceeds, the lifting force of the gas pulls the inflated portion up against the downward restraining force of the roll 32. To this end, the trailer of the inflation unit will be appropriately ballasted to provide the required hold-down force on the balloon.

When the balloon restraining and inflation control unit 30 has been pulled forward into the position illustrated in phantom lines in FIG. 1, the launch balloon 12 will eventually be filled with the required amount of helium, but of course, the atmospheric pressure at ground level will be such that only a portion of the balloon envelope 12 will be expanded into inflated condition. When the filling has been completed, the filling tubes 20 can be disconnected from the helium tanks and closed. The drive unit 60 is then operated to rotate the wheels 66 in a direction such that in cooperation with the cogged tracks 68 they roll the carriage 56 up the tracks 50 to bring the roll 32 into its upper or elevated position, as shown in FIGS. 3 and 4. Simultaneously or thereafter, the unit 30 can be pulled forward by the tractor 80 into a position generally opposite the cable trailer 24.

During the inflation operation, the squeezing pressure on the envelope 32 between the roll 32 and the back-up 40 provided a hold-down force sufficient to keep the launch balloon 12 from rising. After disengagement of the roll 32 from the balloon envelope 12 as the roll is elevated and the unit 30 moved forward, the restraining force on the launch balloon 12 is taken over by the tether cable 26. Nonetheless, it is of advantage to gradually release the balloon 12 by moving the unit 30 forward in the manner just described.

After the unit 30 has been pulled forward and in the course of such movement the launch balloon 12 is gradually payed out and ascends, the coupling 16 is free to pass under the roll 32, which is then in its elevated position (FIGS. 3 and 4). Moreover, the elevated position of the roll 32 permits the unit 30 to pass over the wheels and other rearwardly located elements of the cable trailer 24, the coupling 16 to pass freely under the roll 32 as the balloon ascends, and the main balloon envelope 14 to be progressively lifted up by the launch balloon. In the meantime, the coupling dolly 18 can easily be moved out of the way and the trailers 22 carrying the main balloon 14 can be backed up, if necessary, underneath the roller 32 to provide a better payout of the main balloon envelope. Finally, when the payload (not shown) has been rigged, it may be appropriate to move the unit 30 away from the system for the final release of the balloon from connection with the ground. This operation is accomplished by an electrically or radio-controlled release device which throws off the tethering cable and frees the balloon for normal ascent.

The embodiment of the invention described above is intended to be merely exemplary, and those skilled in the art will be able to make numerous variations and modifications of it without departing from the spirit and scope of the invention.

We claim:

1. In apparatus for launching large balloons, a balloon restraining and inflation control unit comprising a heavy mounting unit, a rotatable balloon inflation roll carried by the mounting unit and adapted to engage a balloon envelope to restrain and control it as it is being inflated and launched, the inflation roll being mounted on the mounting unit to be selectively bodily elevated to various positions between a lower position in which it restrains and controls the balloon envelope during inflation and an elevated position in which it continues to engage the balloon and from which control of the balloon may be transferred to tethering means, and power drive means for selectively moving the inflation roll between such lower and elevated positions.

2. Apparatus according to claim 1 wherein the mounting unit includes a frame including an inclined track, and the roll is mounted on a carriage movably carried by the inclined track, and wherein a roller shaft extends outboard substantially at right angle to a longitudinal plane through the unit.

3. Apparatus according to claim 2 further comprising coacting means on the mounting unit and the carriage including a powered drive for selectively moving the inflation roll up and down the track between its lower and elevated positions.

4. In apparatus for launching large balloons, a balloon restraining and inflation control unit comprising a ballasted mounting unit, a rotatable balloon inflation roll cantilevered laterally from the mounting unit and adapted to engage a balloon envelope to restrain and control it when it is being inflated and launched, a back-up member supporting an uninflated upper part of the balloon envelope, and means for bodily elevating the inflation roll selectively to various positions between a lower position in which it urges the balloon envelope against the back-up member to close off the inflated portion of the envelope from the uninflated portion and also controls the balloon envelope during inflation and an elevated position from which the balloon may be launched.

5. Apparatus according to claim 4 wherein the inflation roll has an hourglass shape such that the uninflated balloon envelope is encompassed by the concave surface of the roll and held in engagement with the back-up member.

6. A method of launching a large balloon comprising the steps of engaging the balloon envelope at a point spaced from its apex between a back-up and a mobile rotatable inflation roll, gradually filling the balloon while moving the mobile roll away from the balloon envelope apex, and bodily elevating the inflation roll upon substantially complete filling of the balloon while still holding it in engagement with the balloon envelope to maintain control thereover and to facilitate the passage of couplings and the like of the balloon and components of the launch apparatus below the roll while thereafter restraining the balloon with a cable.

7. A method of launching a high altitude balloon with the aid of a movable cantilever-mounted hold-down roller comprising the steps of deploying the uninflated balloon envelope along the ground in a substantially straight line, placing the hold-down roller in active position close to the apex of the envelope, inflating the envelope, moving the roller progressively away from the apex of the balloon along the deployed portion of the envelope as an inflated bubble is formed and bodily elevating the roller sufficiently to clear various components of the launching system as the roller approaches the bottom end of the envelope, without dismantling the cantilever roller mounting and while still holding the roller in engagement with the balloon envelope to maintain control thereover.

8. In a method according to claim 7 wherein the inflatable envelope constitutes a part of a tandem balloon system connected to the main balloon by a coupling, the step of elevating the roller sufficiently to clear the coupling, and the further step of moving the roller away from engagement with the balloon envelope upon substantially full erection thereof, without dismantling any portion of the cantilever roller mounting structure, as control of the balloon is taken over by tethering cable means.

References Cited

UNITED STATES PATENTS

| 751,119 | 2/1904 | Thomas | 100—210 X |
| 2,624,480 | 1/1953 | Bartling | 214—100 |
| 2,977,069 | 3/1961 | Huch et al. | 244—31 |
| 3,063,657 | 11/1962 | Coester | 244—31 |
| 3,151,824 | 10/1964 | Struble | 244—31 |
| 3,195,839 | 7/1965 | Dietsche | 244—98 |

FERGUS S. MIDDLETON, *Primary Examiner.*

RICHARD A. DORNON, *Assistant Examiner.*